United States Patent [19]
Ort

[11] 4,334,518
[45] Jun. 15, 1982

[54] HEATING SYSTEM
[75] Inventor: Sterling L. Ort, Lewisberry, Pa.
[73] Assignee: Sol-Fire Inc., Lewisberry, Pa.
[21] Appl. No.: 153,992
[22] Filed: May 28, 1980
[51] Int. Cl.³ .......................... F24B 9/04; F24D 3/00
[52] U.S. Cl. ................................. 126/132; 237/8 R; 126/437
[58] Field of Search ............... 126/132, 121, 400, 364, 126/365, 437, 5; 237/8 R, 8 A, 61, 59, 74, 75; 165/174, 175; 122/22

[56] References Cited
U.S. PATENT DOCUMENTS

| | | | |
|---|---|---|---|
| 463,061 | 11/1891 | Lewis | 126/132 |
| 1,786,453 | 12/1930 | Risdon | 126/132 X |
| 3,958,755 | 5/1976 | Cleer, Jr. | 237/8 R |
| 4,046,320 | 9/1977 | Johnson et al. | 126/132 X |
| 4,049,194 | 9/1977 | Tice et al. | 126/121 X |
| 4,050,626 | 9/1977 | Awalt, Jr. | 126/132 X |
| 4,088,113 | 5/1978 | McIntire et al. | 126/132 |
| 4,131,231 | 12/1978 | Cleer, Jr. | 237/8 R |
| 4,139,152 | 2/1979 | Kronberger, Jr. | 126/132 X |
| 4,153,199 | 5/1979 | Ellmer | 126/132 X |
| 4,159,801 | 7/1979 | Roland | 237/8 R |
| 4,159,802 | 7/1979 | Ficker et al. | 237/8 R |
| 4,204,518 | 5/1980 | Smith | 126/132 |
| 4,211,187 | 7/1980 | Farris | 126/365 X |

*Primary Examiner*—Samuel Scott
*Assistant Examiner*—Randall L. Green
*Attorney, Agent, or Firm*—Steele, Gould & Fried

[57] ABSTRACT

A solid-fuel-burning heating unit comprises a heat transfer fluid circulating through a first heat exchanger in a hollow metal jacket of the heating unit, and through a second heat exchanger in the path of the exhaust gases. The heat exchanger unit in the exhaust path is adapted for ease of cleaning and is further adapted to be reversed in position. The system may be used in a new installation or as a retrofit.

10 Claims, 9 Drawing Figures

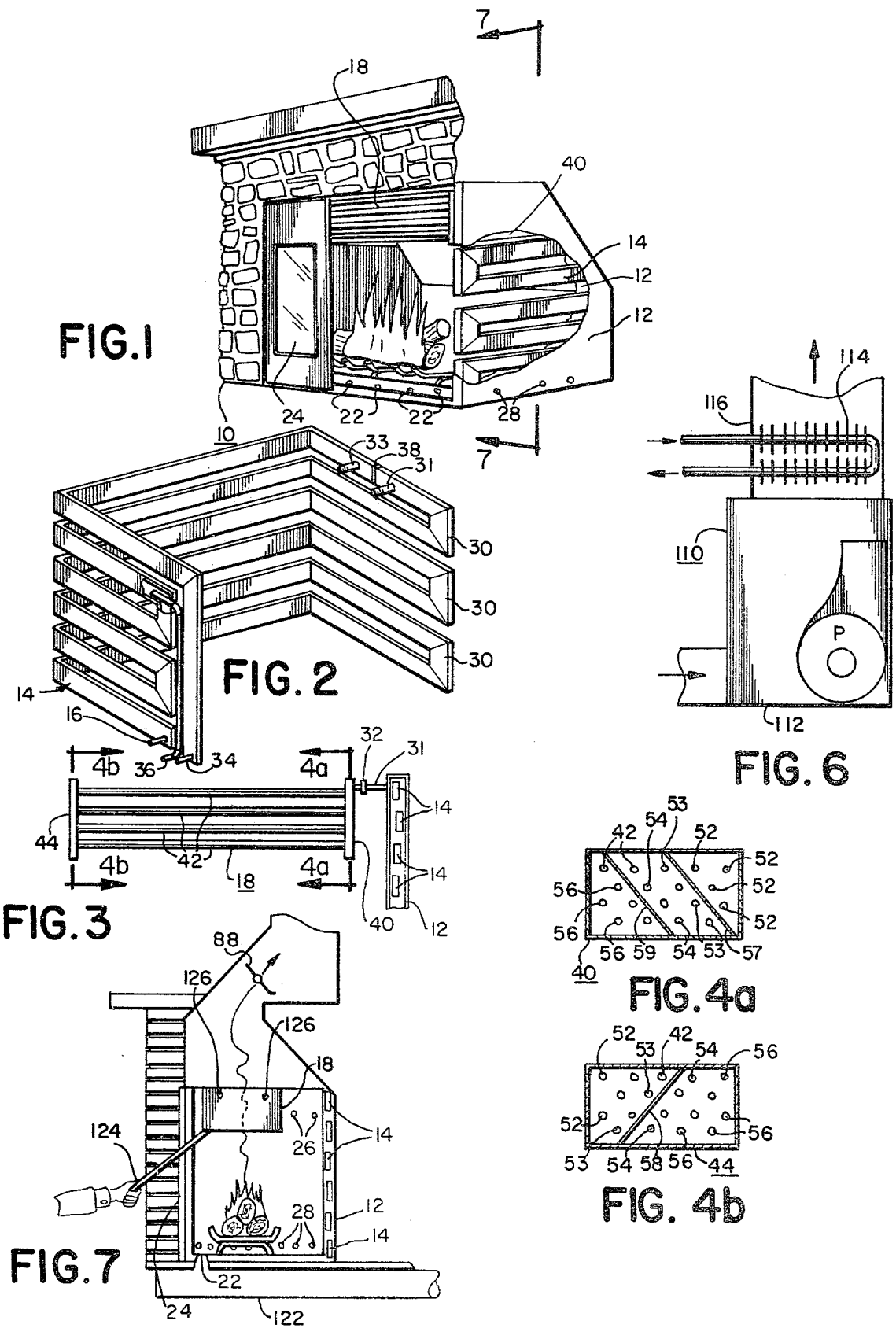

HEATING SYSTEM

BACKGROUND OF THE INVENTION

1. Field of the Invention

This invention relates to the field of solid fuel burning heating units, and in particular, to fireplaces adapted for home use as sole or auxiliary heat sources.

2. Description of the Prior Art

Solid-fuel-burning heating units for dwellings have been used in various styles since prehistoric times. Recently, in response to the shortage and increasing cost of petroleum-based fuels, solid fuels have become once again popular. Such fuels as wood and coal are abundant in this country and can be expected to continue to increase in popularity.

The home fireplace is an example of a home heating unit that uses solid fuel. The fireplaces of the last century often supplied all the heating and cooking requirements of American homes. As fireplaces were commonly replaced by more technologically sophisticated heaters, the fireplaces still in use were primarily decorative. Today, once again fireplaces are being used as heaters, yet the decorative appeal of fireplace heaters remains important.

Concurrent use of a home fireplace as a decoration and a heater presents certain problems for the fireplace designer. As solid fuel is relatively bulky, maximum efficiency is desirable to maximize convenience and to minimize fuel storage requirements. The traditional problem of prevention of buildup of residue is exacerbated by the relatively cool temperature of heat transfer elements upon which creosote tends to condense. Such accumulations of residue can cause catastrophic fires in the fireplace flue and chimney.

In the prior art, various systems have been proposed to capture the heat generated in decorative fireplaces, and to direct the captured heat throughout the structure. This function is sometimes accomplished by directing a heat transfer fluid through a hollow covering on the fireplace, and thereafter through a heat exchanger somehow connected to a conventional building heating system. A system employing such a water jacket approach is demonstrated by U.S. Pat. Nos. 3,958,755 and 4,131,231, both to Cleer, Jr.. The arrangement disclosed is said to be particularly efficient as an auxiliary system for a conventional home hot water system, because of the large surface area for contact between the jacket and the water.

A major drawback of fireplace systems having open hollow jackets, such as the Cleer systems, is that creosote tends to accumulate on the relatively cool inner wall of the fireplace jacket, that is, the wall facing the fire. Circulating heat transfer fluid cools the inner jacket, and incompletely burned hydrocarbons condense on the cool surface. The accumulation is unsightly as well as a fire hazard.

A second development in home systems relates to the design of heat exchangers. U.S. Pat. No. 4,159,801—Roland, and U.S. Pat. No. 4,159,802—Ficker demonstrate heat exchangers that are also useful as fuel support members. Heat exchange fluid is circulated through generally "C"-shaped and-iron devices. These fuel supporting heat exchangers bring the heat transfer fluid into close proximity with the burning fuel. However, the fuel supporting heat exchangers are unattractive in that creosote tends to condense on the cooler surfaces of the heat exchanger leaving visible the relatively large and charred-appearing pipes.

A wood burning swimming pool heater is disclosed in U.S. Pat. No. 4,088,113—McIntire. In a closed stove, a coil of copper pipe carries the heat transfer fluid through the path of the exhaust gases. As the McIntire heating unit makes no provision for removal of creosote, it may be expected that the accumulation of creosote on the heat exchanger may eventually cause a fire in the McIntire flue. In constrast to heating units for swimming pools, which are likely to be located outdoors, such a dangerous arrangement is completely unacceptable for indoor fireplace units.

The present invention provides a water jacket type heat exchanger having internal ducting, and a heat exchanger located in the path of the exhaust gases. Yet the present invention improves on the safety and efficiency of the prior art units in a novel and inventive way.

SUMMARY OF THE INVENTION

It is an object of this invention to maximize convenience, efficiency and safety in a home fireplace unit.

It is also an object of this invention to improve the appearance of a home fireplace heating unit by concealing the heat exchanger tubes and fixtures.

It is another object of this invention to provide for ease of maintenance including easy cleaning, installation and use.

It is yet another object of this invention to provide a system having a long useful life without the necessity of frequent repairs and replacements.

These and other objects are accomplished by a heating system comprising a fireplace having a hollow metal jacket around a fire area; a first heat exchanger having serpentine channels located inside said hollow metal jacket for carrying a heat transfer fluid; a second heat exchanger located in an exhaust gas path, said second heat exchanger circulating the heat transfer fluid from said first heat exchanger through said exhaust path, whereby heat is accumulated; and, means for transferring heat accumulated by said fluid to an object to be heated. The second heat exchanger, located in the exhaust path is adapted for ease of construction and cleaning, and may be conveniently removed and reinstalled. Rather than construction by bending a single pipe, the second heat exchanger is built from a plurality of straight pipe sections. Baffled plenums at either end of the second heat exchanger direct the heat transfer fluid alternately into and out of successive rows of said straight pipe sections, resulting in a serpentine path for the heat exchange fluid directly in the path of the exhaust gases. The combustion chamber is isolated from the space to be heated by doors, combustion air being provided by ducts from an external source. Air spaces between the sides of the metal jacket and the serpentine channels of the first heat exchanger located therein allow a higher temperature in the inner wall of the jacket, and serve to heat additional combustion air to more completely burn exhaust hydrocarbons.

Other objects of this invention will hereafter be apparent to persons skilled in the art. Accordingly, reference should be made to the appended claims to determine the scope of this invention.

BRIEF DESCRIPTION OF THE DRAWINGS

For the purpose of illustrating the invention, there are shown in the drawings forms which are presently pre- FIG. 1 is a cutaway perspective view of the fireplace of this invention.

FIG. 2 is a perspective view of the serpentine channels of the first heat exchanger located within the fireplace jacket.

FIG. 3 is a front elevation of the second heat exchanger, located in the exhaust path.

FIG. 4a is a section view taken along line 4a—4a in FIG. 3; and

FIG. 4b is a section view taken along line 4b—4b in FIG. 3.

FIG. 6 is a schematic diagram illutrating the manner in which the system of this invention can be used in conjunction with a conventional forced air heating system.

FIG. 7 is a section view taken along line 7—7 in FIG. 1.

DESCRIPTION OF THE PREFERRED EMBODIMENT

Figure 5:
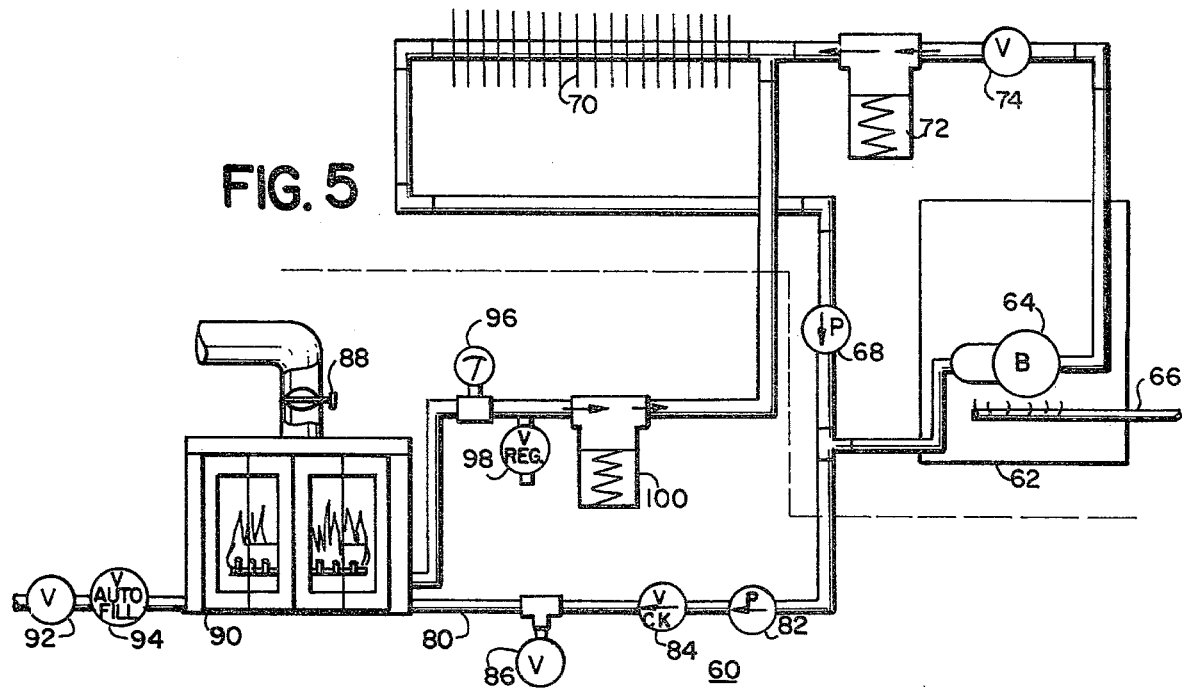
FIG. 5 is a schematic diagram illustrating the manner in which the heating system of this invention can be used in conjunction with a conventional boiler system.

FIG. 1 is a cutaway view illustrating the features of the fireplace unit of the present invention. The fireplace unit, generally indicated as 10, comprises a hollow metal shell 12 surrounding a solid fuel fire. Heat transfer fluid circulates through the rectangular pipes 14 located within hollow metal shell 12. A small space, for example 0.5 cm is allowed between pipes 14 and hollow shell 12 for air to circulate. Pipes 14 contact the enclosing hollow shell 12 at various points, yet such contact is not continuous and therefore does not block air circulation. The various points of contact permit heat transfer by conduction from hollow shell 12 to pipes 14 therein, and to the heat transfer fluid within pipes 14.

The spaces between hollow shell 12 and pipes 14 therein permit convection heating of combustion air as well, as illustrated in FIGS. 1 and 7. Air drawn in at lower vent holes 28 is warmed inside shell 12 and expelled at upper vent holes 26. As lower vent holes 28 take in relatively oxygen-rich air in the lower part of the combustion area, upper vent holes 26 expel warm oxygen-rich air into the flue gases at the upper part of the combustion area. The additional oxygen thus added to the flue gases aids in completing combustion of any remaining hydrocarbons in the flue gases. By this method, less incompletely oxidized flue remains in the exhaust to condense on cool surfaces and form creosote.

Doors 24 are generally to be kept closed. Combustion air is provided via vent holes 22 in the floor of the combustion chamber for example, in the front. Vent holes 22 may be connected to a fresh air inlet duct 122 shown in FIG. 7. Doors 24 may be left open, but efficiency is thereby adversely affected because warm air is drawn from the space to be heated up the flue and out the chimney.

Doors 24 can be made of any suitable material such as glass or cast iron, depending on the installation. Maximum efficiency is obtained using cast iron doors. The cast iron construction radiates heat, and conduction and convection heat the air in the space to be heated. Glass doors allow radiant heat and light to pass directly from the fire to the space to be heated. In addition, appearance is best with glass doors, so long as they are kept clean. The user may find that the necessity of frequent cleaning outweighs the benefit of improved appearance. Therefore, cast iron doors are presently preferred.

After the heat transfer fluid passes through rectangular pipes 14, it is passed into second heat exchanger 18 located directly in the path of exhaust gases. Heat exchanger 18 is provided with convenient couplings 32 whereby the unit may be removed for cleaning, or may be turned upside down and reconnected. This arrangement allows convenient removal of creosote which tends to accumulate on the relatively cool surfaces of the second heat exchanger 18.

FIGS. 2 and 3 illustrates the details of rectangular tubing 14 located within hollow metal jacket 12. The tubing is preferably common boiler tubing of strength complying with relevant standards for boilers and is cut from straight sections. End caps 30, having diagonally cut ends, are conveniently welded over the diagonally cut ends of the longer pipe sections to close the pipes. Heat transfer fluid entering at 16 moves in a zig-zag path alternating in direction around metal shell 12 from one side of the fireplace to the other and progressing from the bottom of the fireplace to the top. At the top transit, the tubing is internally blocked at point 38, forcing heat transfer fluid through hookup 31 into second heat exchanger 18. Returning fluid passes through hookup 33 and then to outlet 34.

Construction of rectangular tubing 14 inside hollow metal jacket 12 can provide several advantages if done according to this invention. As previously discussed, rectangular tubing 14 is slightly smaller than hollow metal shell 12, leaving room for air to circulate inside hollow metal shell 12. Moreover, as contact between rectangular tubing 14 and hollow metal shell 12 is not continuous, the inner side of hollow metal shell 12, that is, the side facing the fire, becomes much hotter than could be expected if contact was continuous of if hollow metal shell 12 was completely filled with heat transfer fluid. As creosote collects on the coolest surfaces, creosote buildup is avoided by allowing hollow metal shell 12 to heat up in this manner.

The rectangular tubing 14 is conveniently assembled outside hollow metal shell 12, rather than assembling the unit from the inside out. Holes or slots in hollow metal jacket 12 are left for passage of hookups 31, 33 and for inlet 16, fill line 36 and outlet 34. It must be noted that fill line 36 is attached to the transit of rectangular tubing 14 closest to the input 31 for second heat exchanger 18. Since the second heat exchanger is directly exposed to hot exhaust gases, whenever the system is low on heat transfer fluid, second heat exchanger 18 should be filled first to avoid damage due to melting that might occur if heat exchanger 18, the system's highest point, was filled last.

FIG. 3, 4a and 4b illustrate the construction of second heat exchanger 18 located in the path of the exhaust gases. Straight pipe sections 42 are welded or soldered into end plenum sections 40. Baffles 57, 58, 59 are then added to divide end sections 40 internally to effect the direction of heat transfer fluid, alternatively from side to side, passing four times over the fire. Heat transfer fluid may be traced as follows, with reference to FIGS. 3, 4a and 4b. Incoming fluid passes through hookup 32 into plenum 40 where baffle 57 directs the fluid into pipes 52 as shown in FIG. 4a. The fluid travels down pipes 52 to opposite plenum 44. Baffle 58 in opposite plenum 44 directs the fluid from pipes 52 into the adjacent diagonal row of pipes, including pipes 53. The fluid then returns in pipes 53 to the original plenum 40 and is directed by baffles 57 and 59 into the next row of pipes, 54. Back in opposite plenum 44, baffle 58 directs the fluid into pipes 56. After thus crossing repeatedly from plenum 40 to opposite plenum 44, the fluid finally arrives back at plenum 40 through pipes 56 having crossed the exhaust path four times. The fluid then passes through hookup 33, shown in FIG. 2, back into rectangular tubing 14 and out through outlet 34.

Baffles 57, 58, 59 may be installed vertically, horizontally or diagonally, provided that the incoming or outgoing plenum divisions encompass single rows while intermediate plenum divisions encompass two rows. Of course a single row could comprise one or more pipes as desired. Eighteen tubes and three baffles are illustrated in the drawings. It may be appreciated that additional tubes and/or baffles would increase the efficiency of the unit. However, for ease of construction and for ease of removal of creosote it is not recommended that an excessively large number of pipes or baffles be used. As the pipes are located at alternating positions, layer by layer, a stick or other implement may be inserted between the pipes to scrape away creosote periodically, as illustrated in FIG. 7.

FIG. 5 illustrates the connection of the heating system of this invention to a conventional boiler heating system. The conventional system 62 comprises a boiler 64 fueled by gas or oil from source 66. The heat transfer fluid, usually water, is directed by circulating pumps 68 through heat exchanger 70, located along the baseboards of the space to be heated. A conventional radiator may be employed in place of baseboard heat exchanger 70. Pressure variations are equalized by expansion tank 72, and the flow is controlled by valve 74. Auxiliary heating system 60 is connected in parallel with the conventional heating system. Auxiliary circulating pump 82 directs the heat transfer fluid through check valve 84, past purge valve 86 and into the fireplace unit from intake 80. As indicated in FIG. 1, the heat transfer fluid passes through rectangular pipes 14 and through heat exchanger 18, accumulating heat from each. Temperature indicator 96 may be advantageously connected to an alarm buzzer (not shown), or may be connected to a control system to control the temperature of the heat transfer fluid by controlling the combustion rate via positioning of flue damper 88. Over pressure may be relieved by valve 98, and variations in pressure are equalized by expansion tank 100. Valve 92 connects the entire system to the house water supply. Valve 94 is an automatic fill valve that replaces water lost through overpressure valve 98 or purge valve 86.

FIG. 6 indicates the preferred connection to a forced air heating system. Inasmuch as the fireplace system is the same as in FIG. 5, only the forced air system is depicted. A heat exchanger 114, corresponding to the baseboard heat exchanger 70 of FIG. 6, is installed at the air outlet of the forced air heating system. The conventional fan 112 blows air over heat exchanger 114 as well as over the conventional system heat exchanger (not shown). The heated air is then directed via output 116 into the house duct work.

FIG. 7 is a side cross-sectional view of the fireplace system taken along line 7—7 in FIG. 1. FIG. 7 illustrates cleaning of the overhead heat exchanger 18. An implement 124 is inserted between the pipes of the heat exchanger. As illustrated in FIGS. 4a and 4b, pipes 42 are positioned such that the implement may be inserted vertically, horizontally or at 45°. This is possible because the pipes are installed at alternating spaced levels as shown. Creosote must be scraped away periodically to avoid flue fires. As the temperature of the heat exchanger is lower than the temperature of the exhaust gases, creosote tends to selectively condense on the cooler heat exchanger.

An alternate method of cleaning heat exchanger 18 would be to remove the heat exchanger entirely, for wire brushing or similar cleaning. The quick disconnect hookups 32, illustrated in FIGS. 1, 2 and 3, facilitate removal of heat exchanger 18 at supply and discharge pipes 126. The heat exchanger may be replaced in the same attitude as it was taken out, or the heat exchanger may be flipped upside down and reinstalled at a greater distance from the fire. FIG. 7 also illustrates the external connection for combustion air 122. As the front of the fireplace is sealed by doors 24 to avoid escape of heat from the house, combustion air is provided via a pipe communicating with the outdoors, or with some other convenient source of air. The combustion itself tends to draw the air through external connection 122, thus no fan is required. FIG. 1 illustrates the vents 22 in the floor of the combustion chamber communicating with external connection duct 122. Duct 122 may also communicate with the hollow space of the hollow metal jacket in lieu of lower vents 28. The rate of flow of air through duct 122 is controlled by opening or closing damper 88 in the exhaust flue. It must be noted however that a severely-damped fire will generate more creosote than will a freely burning fire. Accordingly, the rate of heat generation is preferably controlled by the amount of fuel used, as well as by adjusting the damper, thus completely controlling the burning of the fuel.

The preferred material for the hollow fireplace jacket, rectangular pipes therein, and heat exchanger is iron or steel. Although copper may provide for more efficient transfer of heat, the intimate relation of the fire and the heat exchange surfaces requires a strong material. The heat exchanger pipes must be periodically scraped, further suggesting that a strong material is required. Moreover, rectangular pipes 14 function similarly to a boiler, and must conform to relevant building codes for boilers.

Figure 8:
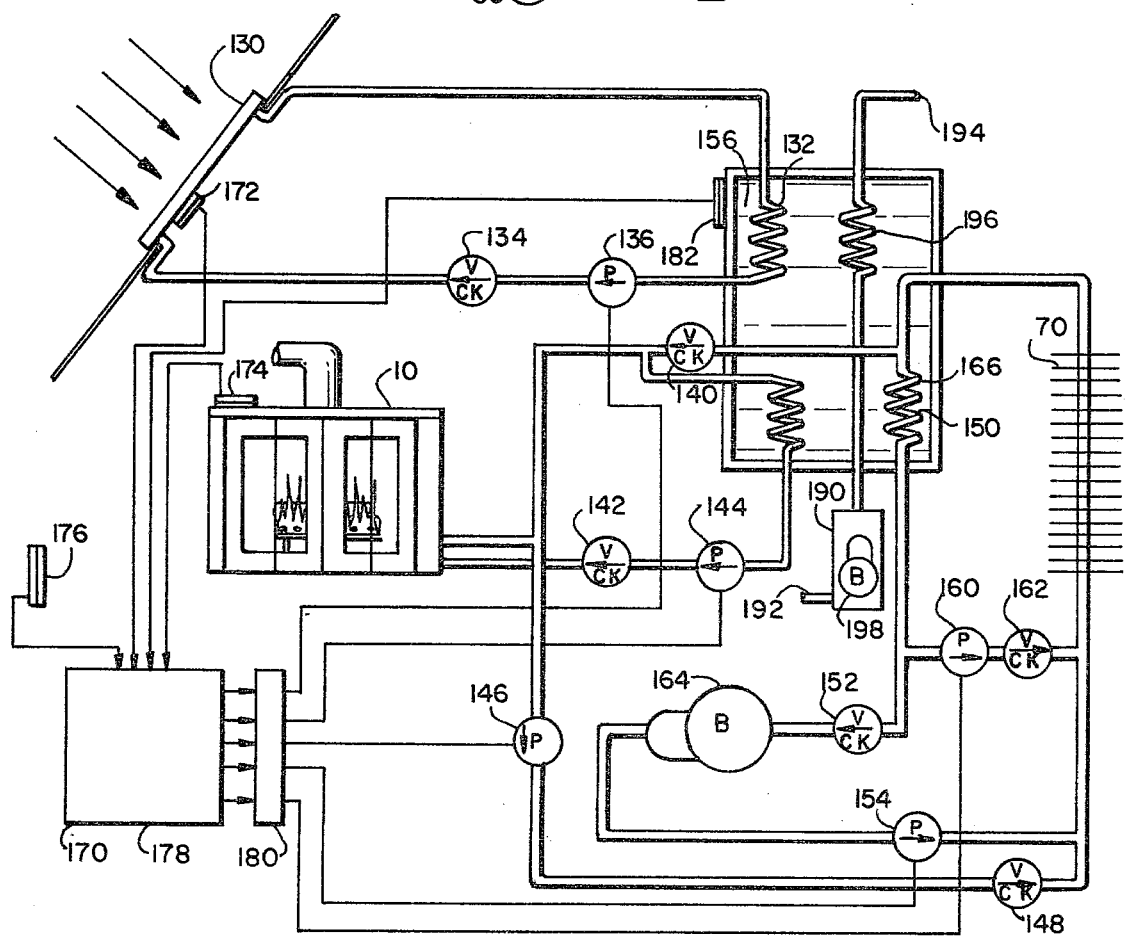
FIG. 8 is a schematic diagram illustrating a total home heating system employing the system of this invention.

FIG. 8 illustrates a preferred embodiment which employs solar, solid fuel and conventional heat and hot water systems for maximum efficiency. Fireplace 10 is operated as above-described, directly supplying heat transfer fluid to baseboard heat exchanger 70, or if not needed, to reservoir 150. Similarly, solar collector 130 conveys heat to the reservoir, only from which such heat may be extracted as need. Conventional hot water heater 190, either burns fuel or extracts needed heat from reservoir 150. A conventional heating system extracts heat from the fireplace, from the reservoir, or from its own fuel. In this total system, the conventional heater and water heater elements are the auxiliary rather than the primary generators of heat. Should adequate heat not be supplied by solar collector 130 and fireplace 10, then water heater boiler 198 and heater boiler 164 will burn conventional gas or oil to generate heat and hot water. When adequate heat is collected by solar unit 130 and/or fireplace 10, then hot water boiler 198 will not be achieved, and the heating system will be operated to circulate heat transfer fluid from the fireplace, or fluid passed through reservoir 150, leaving boiler 164 out of the loop. Operation of the respective systems is coordinated by controller 170 based on information received from thermostats located in the space to be heated, at the heat reservoir and at the heat collection points.

The solar collection loop collects heat at collector 130, and discharges heat into reservoir 150 at heat exchanger 132. Controller 170 is programmed to activate solar system pump 136 to pump heat transfer fluid through check valve 134, collector 130 and heat exchanger 132 whenever solar thermostat 172 indicates a temperature greater than reservoir thermostat 182. The thermostats 172, 174, 176 and 182 may be the setpoint type, wherein contacts "made" by said thermostats indicate that the temperature is greater than a setpoint. Alternatively, said thermostats may be of the thermocouple type, providing an analog indication of temperature over a continuous range. Various systems possible include microprocessor digital control employing single or multiple setpoint thermostats, as well as proportionally controlled systems using analog temperature indication and variable speed pump motors.

The fireplace heat collection loop operates in the same manner as the solar collection loop. Thermostat 174 provides controller 170 with information as to the heat available from fireplace 10. When thermostat 174 indicates available heat from fireplace 10, controller 170 activates fireplace pump 144 to direct heat transfer fluid through check valve 142 and into fireplace unit 10. Available heat may also be detected by comparing inlet and outlet temperatures at fireplace 10, with use of a differential temperature sensor. As shown in FIGS. 1 through 4, the heat transfer fluid accumulates heat through metal jacket 12 and exhaust gas heat exchanger 18. The heat transfer fluid then passes either through heat exchanger 140 in reservoir 150 and back to pump 144, or, through pump 146, check valve 148, baseboard 70 and heat exchanger 140, returning to pump 144. As with the solar loop, thermostat 174 and pump 144 may be of the on/off type, or may operate over a range of temperatures and speeds. Controller 170 can thereby transfer available heat to the house, and store any excess in reservoir 150.

Heat accumulated in reservoir 150 is stored until required for domestic hot water or baseboard heat. Reservoir 150 is surrounded by insulating layer 156 to prevent heat loss to the surrounding space. Reservoir 150 may advantageously be used as a preheater for the boiler for the baseboard system. The heat exchange fluid of reservoir 150 may also be pumped directly through baseboard heat exchanger 70.

Assuming the solar and fireplace units are inactive, if reservoir thermostat 182 indicates adequate stored heat, then when room thermostat 176 indicates inadequate temperature in the room, controller 170 activates pump 160 to direct heat transfer fluid through check valve 162 and baseboard heat exchanger 70 and then back through reservoir 150. In this situation, boiler 164 and boiler pump 154 need not be activated.

If reservoir thermostat 182 indicates inadequate stored heat in reservoir 150, i.e., when the temperature of reservoir 150 is less than room temperature as indicated by room theremostate 176, then boiler 164 is activated. Boiler 164 may directly heat fluid from reservoir 150, or as shown, the room heating loop may be a closed loop comprising a heat exchanger located within closed reservoir 150. When the room heating loop is closed, then heat stored in the reservoir is transferred to the heat transfer fluid in the closed room heating loop. If boiler 164 and pump 154 are activated, then any remaining heat from reservoir 150 will serve to preheat heat transfer fluid arriving at boiler 164 through check valve 152. If pump 160 is selected by controller 170 due to adequate stored heat, rather than boiler 164 and pump 154, then heat transfer fluid warmed within reservoir 150 will be pumped through check valve 162 and baseboard heat exchanger 70, to be again warmed within said reservoir.

Domestic hot water heater 190 is supplied with fresh cold water at supply point 194. As hot water is used by house occupants, hot water discharged at exit 192 is replaced by fresh water from supply point 194, prewarmed by transfer of reservoir heat through heat exchanger 196. If reservoir heat is adequate, boiler 198 need not be activated. Nevertheless, so long as reservoir 150 is at a higher temperature than cold water supplied at 194, energy will be saved by this preheating of supply water.

Controller 170 can be an analog or digital mechanism as described above. At its simplest, controller 170 processes digital status data from contact closures provided by thermostats 172, 174, 176, 182. The thermostat status indications are the input to a digital gate network in logic stage 178. Logic stage outputs are connected to switching stage 180 inputs. Switching stage 180 may comprise relays or solid state drivers for the respective motors. Alternatively, a more sophisticated system can advantageously employ proportional control. Analog indication of heat availability is then provided by thermostats 172, 174 and 182, while feedback is returned to the controller by thermostat 176 indicating room temperature.

Additional variations on these preferred embodiments will now be apparent to the those skilled in the art. Reference should be made to the appended Claims rather than the foregoing Specification as indicating the true scope of this invention.

I claim:

1. A heating system for fireplaces and the like, having a fuel combustion area and an exhaust path for hot gases, comprising:

(a) A combustion air supply providing air at a lower portion of the fuel combustion area;

(b) A hollow metal jacket enclosing the fuel combustion area on three sides, said jacket having lower air holes along a lower edge thereof for drawing oxygen-rich air from the fuel combustion area, and upper air holes for discharging the oxygen-rich air into the exhaust path;

(c) A first heat exchanger placed loosely in the hollow of said jacket and having channels for carrying a heat transfer fluid, said fluid accumulating heat energy from contact with the first heat exchanger, the first heat exchanger from contact with the metal jacket, and the metal jacket from the combusting fuel, a portion of the heat energy serving to heat the oxygen-rich air passing through the jacket;

(d) A second heat exchanger disposed in the exhaust path, and connected to said first heat exchanger via an input pipe and an output pipe, the heat transfer fluid accumulating further heat energy within the second heat exchanger from the exhaust gases passing through the exhaust path;

(e) A source of heat transfer fluid, in fluid communication with the first and second heat exchangers, whereby the system may be charged with heat transfer fluid; and, (f) Means for transferring the accumulated heat energy in said fluid to an object or space to be heated, said means for transferring accumulated heat energy connected in a fluid loop including the first and second heat exchangers.

2. The heating system of claim 1, further comprising:

Means for controlling combustion comprising a damper disposed in the exhaust path and operable to restrict flow of the hot gases; and, Means for confining combustion to said fuel combustion area, comprising doors disposed between the combustion area and the space to be heated, whereby upon closing the doors, passage of air from the space through the fireplace is prevented.

3. The heating system of claim 1, wherein said first heat exchanger is constructed of lengths of tubing of rectangular cross-section of width less than the hollow of the metal jacket, said lengths cut at diagonals and rigidly attached one to another at said diagonals, whereby a zig-zag construction is obtained.

4. The heating system of claim 1 wherein said object or space to be heated is a fluid reservoir in a conventional boiler in a home heating system.

5. The heating system of claim 1, wherein said second heat exchanger comprises a plurality of horizontal pipes disposed alternately, at spaced levels, whereby an implement may be inserted vertically, horizontally and diagonally between said pipes for removing accumulations of incompletely combusted material thereon while the second heat exchanger is in position in the exhaust path.

6. The heating system of claim 5, wherein said input pipe and output pipe connect to quick release means for connecting and disconnecting the input and output pipes, and said input and output pipes project horizontally from said second heat exchanger, permitting connection of said second heat exchanger reversably in either of two positions.

7. The heating system of claims 5 or 6, wherein said second heat exchanger further comprises at least one end plenum, said end plenum having baffles directing the heat exchange fluid alternately into and out of successive rows of said horizontal pipes, each successive row comprising at least one pipe.

8. The heating system of claim 1, wherein said means for transferring the accumulated heat energy is common to at least one additional heat generating system.

9. The heating system of claim 8, wherein said additional heat generating system is a solar heating system having a solar collector and means for transferring collected heat to a heat storage reservoir, said reservoir being disposed in heat exchanging contact with said fireplace heating system.

10. The heating system of claim 8, wherein said object or space to be heated is said heat storage reservoir, said system controllably adapted to discharge heat from said reservoir to at least one room.

* * * * *